United States Patent [19]

Abraham et al.

[11] Patent Number: 5,474,860

[45] Date of Patent: Dec. 12, 1995

[54] SOLID POLYMER ELECTROLYTES

[75] Inventors: Kuzhikalail M. Abraham, Needham; Mohamed Alamgir, Dedham; Hyoun S. Choe, Waltham, all of Mass.

[73] Assignee: EIC Laboratories, Inc., Norwood, Mass.

[21] Appl. No.: 249,504

[22] Filed: May 26, 1994

[51] Int. Cl.[6] .................................................. H01M 10/40
[52] U.S. Cl. ........................................ 429/192; 252/62.2
[58] Field of Search ............................ 429/192; 252/62.2

[56] References Cited

U.S. PATENT DOCUMENTS

| | | | |
|---|---|---|---|
| 4,303,748 | 12/1981 | Armand et al. | 429/192 |
| 5,061,581 | 10/1991 | Narang et al. | 429/192 |
| 5,219,679 | 6/1993 | Abraham et al. | 429/192 |
| 5,252,413 | 10/1993 | Alamgir et al. | 429/192 |
| 5,262,253 | 11/1993 | Golovin | 429/192 |

*Primary Examiner*—Stephen Kalafut
*Assistant Examiner*—Carol Chaney

[57] ABSTRACT

This invention relates to Li ion ($Li^+$) conductive solid polymer electrolytes composed of poly(vinyl sulfone) and lithium salts, and their use in all-solid-state rechargeable lithium ion batteries. The lithium salts comprise low lattice energy lithium salts such as $LiN(CF_3SO_2)_2$, $LiAsF_6$, and $LiClO_4$.

8 Claims, 2 Drawing Sheets

SOLID POLYMER ELECTROLYTES

This invention was made with Government support under Contract DE-FG02-92ER81366 awarded by the Department of Energy. The Government has certain rights in this invention.

FIELD OF INVENTION

This invention pertains to Li ion conductive solid polymer electrolytes for use in rechargeable batteries. In particular, it pertains to polymer electrolytes with conductivities of greater than $10^{-4}$ ohm$^{-1}$.cm$^{-1}$ at room temperature and their use in Li anode and Li ion anode rechargeable batteries with operational capability at room temperature.

BACKGROUND OF THE INVENTION

There is a great deal of current interest in Li ion conductive solid polymer electrolytes due to their applications in lightweight, high performance, solid-state rechargeable batteries, electrochromic devices, and sensors. When used in a battery they serve two purposes; they are the separator and they are the medium for transporting ions. The classical Li ion conductive solid polymer electrolyte is poly(ethylene oxide) (PEO) complexed with low lattice energy lithium salts such as $LiClO_4$. These electrolytes, however, exhibit conductivities of $10^{-7}$ to $10^{-4}$ $\Omega^{-1}$ cm$^{-1}$ in the temperature range of 40° to 100° C., which are too low for the fabrication of solid-state batteries for room temperature applications. A room temperature conductivity of about $10^{-3}$ $\Omega^{-1}$.cm$^{-1}$ desired in electrolytes for such batteries.

There has been progress in raising the room temperature conductivities of polymer electrolytes from $\leq 10^{-7}$ $\Omega^{-1}$.cm$^{-1}$ to about $10^{-5}$ $\Omega^{-1}$.cm$^{-1}$. This is illustrated by the conductivity of $6.5\times10^{-5}$ $\Omega^{-1}$.cm$^{-1}$ for the electrolyte derived from poly[bis-((methoxyethoxy)ethoxy)phosphazene] (MEEP) and lithium bis(trifluoromethanesulfone)imide, $LiN(CF_3SO_2)_2$ (Abraham et at., Chemistry of Materials, 3,339 (1991)). However, a major drawback of MEEP-based electrolytes is their poor mechanical strength. At ambient temperatures, they are glutinous materials and slowly flow under pressure. Consequently, although the MEEP-based electrolytes have 2–3 orders of magnitude higher conductivities than PEO-based electrolytes, they cannot be used as separators in solid-state batteries.

Recently, a group of polymer electrolytes with room temperature conductivities of the order of $10^{-3}$ $\Omega^{-1}$cm$^{-1}$ have been synthesized in this laboratory (Abraham et al., U.S. Pat. No. 5,219,679). They have been prepared via a non-conventional approach, whereby a polymer matrix such as poly(acrylonitrile) (PAN) is plasticized with solutions of low lattice energy lithium salts in low molecular weight organic solvents with high dielectric constants. The salts include $LiN(CF_3SO_2)_2$, $LiAsF_6$, and $LiClO_4$ and the solvent comprises a mixture of ethylene carbonate (EC) and propylene carbonate (PC). Our work along this line has led to the discovery of other polymer matrices which can be used to prepare polymer electrolytes with high room temperature conductivity. These include poly(vinyl pyrrolidinone) (Abraham et at., U.S. Pat. No. 5,219,679) and poly(vinyl chloride) (Alamgir et at., U.S. Pat. No. 5,252,413).

In this invention, we disclose new solid polymer electrolytes in which the polymer matrix is poly(vinyl sulfone), and they are especially useful for the fabrication of "Li ion" batteries. Lithium ion batteries represent a major advance toward the development of safe, high energy-density, rechargeable batteries. In these batteries, the lithium shuttles between the interstitial sites of the anode and the cathode without the plating of metallic Li. An example of a Li ion battery is the $C/LiMn_2O_4$ system in which the anode is graphitic carbon and the cathode is lithiated manganese oxide, $LiMn_2O_4$. To effectively function as a separator in such batteries, the polymer electrolyte must be electrochemically stable to the carbon anode, whose potentials lie in the 0.01 to 1.0 V range versus $Li^+/Li$, and to the high voltage $LiMn_2O_4$ cathode, whose potentials extend up to about 4.5 V versus $Li^+/Li$. Consequently, for solid polymer electrolytes to be useful in all-solid-state, rechargeable Li ion batteries with operational capabilities at room temperature, they must have ionic conductivities in the neighborhood of $10^{-3}$ $\Omega^{-1}$cm$^{-1}$ at room temperature, adequate mechanical stability, and electrochemical stability from 0.0 to about 4.5 V versus $Li^+/Li$.

SUMMARY OF THE INVENTION

An object of this invention is to provide solid polymer electrolytes with high ionic conductivities, mechanical strength, and anodic stabilities for use in all-solid-state, high voltage, rechargeable Li ion batteries.

Another object of this invention is to provide solid polymer electrolytes based on poly(vinyl sulfone).

Still another object of this invention is to provide solid polymer electrolytes for Li ion batteries.

DETAILED DESCRIPTION OF THE INVENTION

Figure 1:
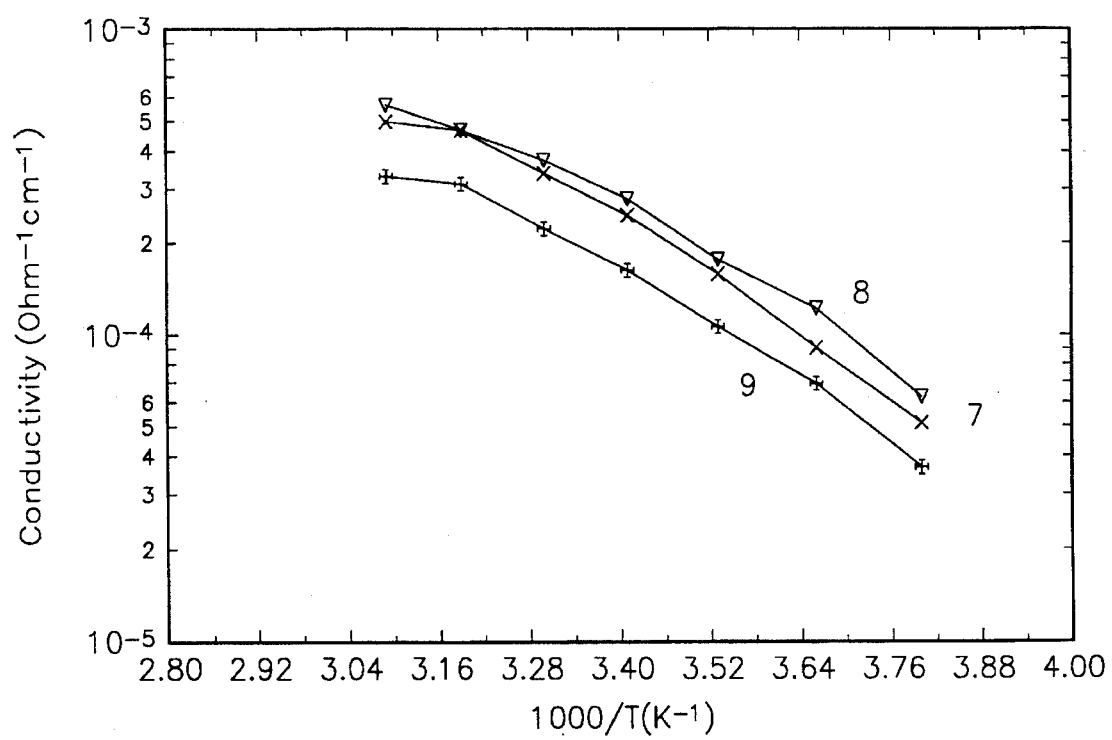
FIG. 1 shows the conductivities of PVS-based electrolytes each containing about 5 mol % $LiN(CF_3SO_2)_2$ and, for electrolyte number 7, 60 mol % PC, for number 8, 30 mol % PC and 30 mol % Sulfolane, and for electrolyte number 9, 30 mol % PC and 30 mol % EC. The conductivities are presented as a function of reciprocal temperature ranging between −10° and 50° C.
Figure 2:
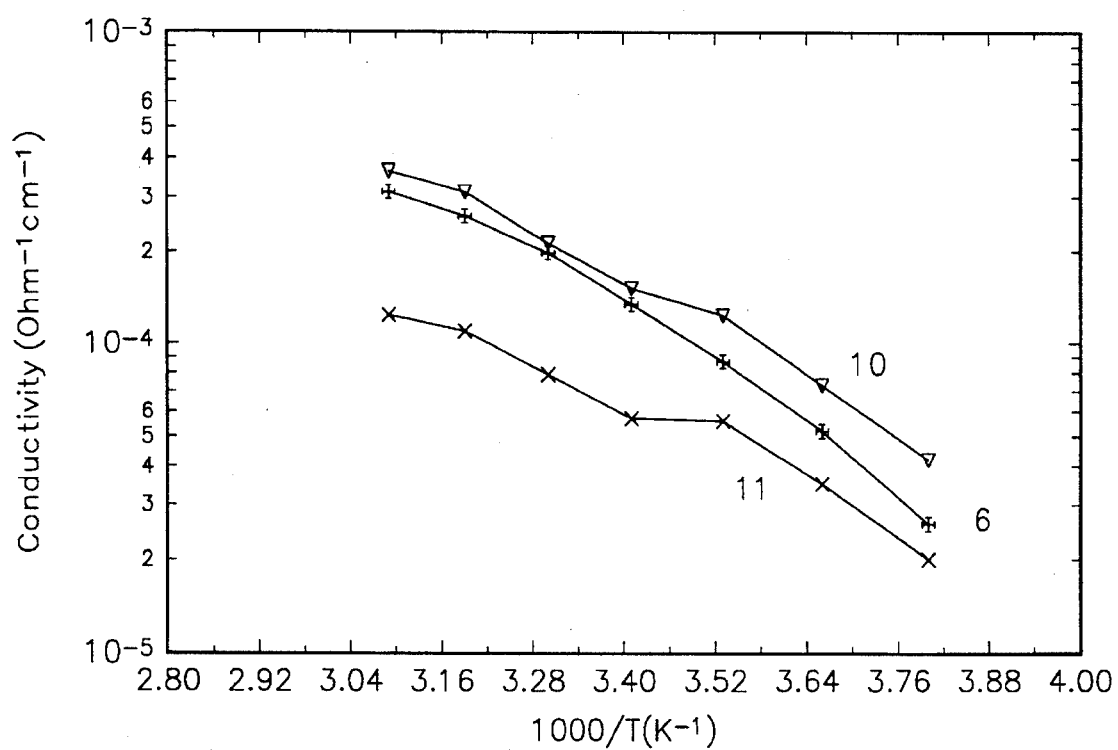
FIG. 2 gives the conductivities of PVS-based electrolytes containing three different salts with $LiN(CF_3SO_2)_2$ in electrolyte number 6, $LiAsF_6$ in electrolyte number 10, and $LiClO_4$ for electrolyte number 9.

In a preferred embodiment of the present invention, poly(vinyl sulfone) (PVS) is used as the polymer electrolyte host matrix because its sulfone (o=S=o) functional group is very resistant to electrochemical oxidation, which implies that polymers having such electron withdrawing moiety will possess high anodic stability. The sulfone group also complexes readily with alkali metal cations, thereby dissolving substantial amounts of alkali metal salts and providing high concentrations of charged ions.

In some embodiments of this invention the solid electrolyte comprises complexes of Li salts with poly(vinyl sulfone). The electrolyte precursor mixture in this case is a solution of Li salt in vinyl sulfone and the solid electrolyte is obtained by polymerizing this solution.

In other embodiments of this invention, ethylene carbonate (EC), propylene carbonate (PC), sulfolane (Sl), and theft mixtures arc used as plasticizing solvents for the PVS electrolytes. All of these solvents have high dielectric constants, low vapor pressures, and wide electrochemical stability ranges, properties which aid in making highly conductive, mechanically and anodically stable polymer electrolytes.

The ionizable alkali salts used in this invention include $LiN(CF_3SO_2)_2$, $LiAsF_6$, and $LiClO_4$. These salts have low lattice energies, and hence dissociate readily into the respective ions in the polymer host medium. They also have good oxidation stabilities due to the strong electron withdrawing anions, $(CF_3SO_2)N^-$, $ASF_6^-$, and $ClO_4^-$, respectively.

The precursor mixture for the plasticized electrolyte of this invention comprises 60 mol % of the plasticizer solvent, about 35 to 37 mol % vinyl sulfone, and about 3 to 5 mol % of the lithium salt. This composition resulted in mechanically stable and highly conductive polymer electrolytes when polymerized.

The said polymer electrolytes were synthesized by irradiation of the electrolyte precursor mixture by UV light, using a small amount of Darocur (1–2 wt. %) as the photoinitiator. Chain polymerization via photoinitiation generally consists of four distinct steps, namely, (i) the production of the primary radicals, (ii) the initiation of the chain radicals, (iii) the propagation of the chain radical, and (iv) the termination of chain propagation by the removal of the radicals.

The polymerization of the precursor mixture is carried out by creating primary radicals from the initiator, Darocur (see equation 1). The primary radicals then combine with the monomer, vinyl sulfone, to create monomer radicals, and chain propagation is brought about by the reaction of the monomer radicals with other monomers, as given in Scheme I.

Infrared (IR) spectroscopic analysis of a mixture of vinyl sulfone monomer and Darocur before and after polymerization was carried out to verify its polymerization under UV irradiation. There appeared to be three major changes in the spectrum on polymerization. The most prominent change was a sharp peak appearing at 1451 $cm^{-1}$, which represents carbon-carbon single bonds formed during polymerization. The spectrum also showed a new carbon-hydrogen stretching, depicted by the conversion of the single peak at 2971 $cm^{-1}$ into a doublet. The third change was the conversion of the double peak in the 950 to 1000 $cm^{-1}$ region into a singlet, which was most likely due to the cis-trans transition of the terminal vinyl group on polymerization. Thus, the IR spectra confirmed that vinyl sulfone was effectively polymerized via in situ photopolymerization, using Darocur as the photoinitiator. IR spectral studies also revealed that the electrolyte precursor mixture consisting of vinyl sulfone, the plasticizer solvent or solvent mixture and the Li salt polymerizes to form the solid polymer electrolyte when irradiated with UV light.

For a high energy density ambient temperature battery embodying this invention, the negative electrode material preferably consists of lithium. For certain other battery applications it may consist of a lithium alloy or amalgam. If a lithium alloy is used, it is preferably a lithium-tin, lithium-lead, lithium-zinc, lithium-aluminum or lithium-magnesium alloy having at least 50% or more preferably at least 65% lithium by weight.

Further, the electrolytes of this invention are suitable for use in conjunction with Li insertion anodes such as graphitic carbon, $Li_xTiS_2$ or $Li_xWO_2$. The graphitic carbon will be that derived from graphite, petroleum coke, benzene or other carbonaceous materials.

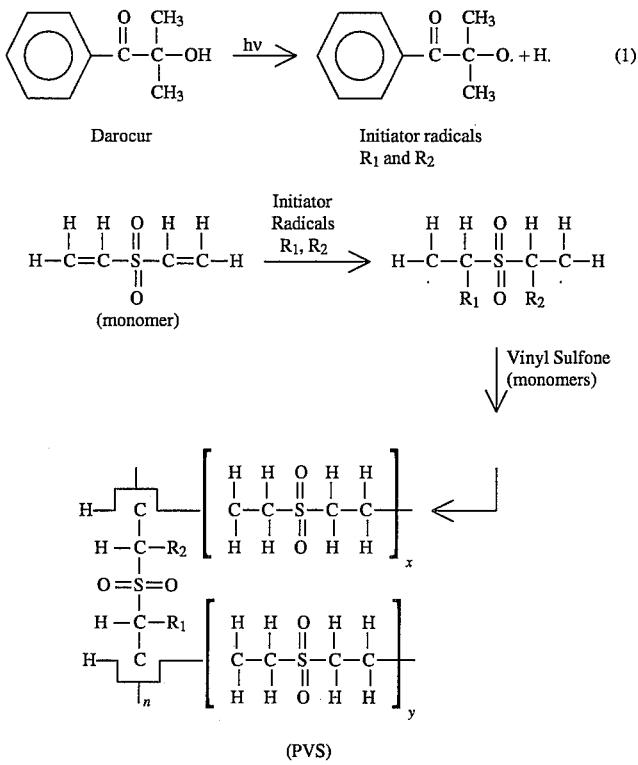

Scheme I: Polymerization of Vinyl Sulfone

Also, electrolytes made in accordance with this invention may be used in cells where the anode is a material other than lithium, e.g. potassium, sodium, magnesium, calcium or zinc, or a mixture thereof with or without lithium. Furthermore, while the invention is most advantageous in providing high energy density primary, and secondary cells, the electrolyte may be formulated so as to provide stable low or medium energy density cells.

For a high energy density ambient temperature battery, the positive electrode material preferably consists of a metal or mixed oxides or metal chalcogenides. The metal oxides include $V_6O_{13}$, $V_2O_5$, $MnO_2$, $LiCoO_2$, $LiNiO_2$, $Li_xMn_y$, $LiM_{1-y}M^1{}_yO_z$, while metal chalcogenides include $TiS_2$, $FeS_2$. Other positive electrode materials that may be used are lithium polysulfide ($Li_2S_n$) and organic compounds such as polypyrrole, polythiophene, polyacetylene.

The following examples further illustrate the present invention.

EXAMPLE 1

PVS-based electrolytes containing $LiN(CF_3SO_2)_2$ were obtained using the general method described earlier. An electrolyte precursor mixture consisting of 2.19 g PVS, 3.063 g PC, 0.431 g $LiN(CF_3SO_2)_2$, and 5 drops of Darocur (see electrolyte #1 in Table 1) was cast between two glass slides, covered with transparent Teflon films to prevent the polymer film from sticking to the glass slides. The glass slide was then irradiated with UV light in an Argon atmosphere, and a homogeneous transparent film (100–150 μm thick) was obtained after irradiating for about 40–60 mins. Table 1 gives a list of the electrolytes prepared this way from different compositions (expressed in mol %) of electrolyte precursor mixtures containing $LiN(CF_3SO_2)_2$.

TABLE 1

| Electrolyte Number | VS mol % | EC mol % | PC mol % | Sulfolane mol % | $LiN(CF_3SO_2)_2$ mol % |
| --- | --- | --- | --- | --- | --- |
| 1 | 37.0 | — | 60 | — | 3.0 |
| 2 | 37.6 | 60 | — | — | 2.4 |
| 3 | 36.6 | — | — | 60 | 3.4 |
| 4 | 37.1 | 30 | — | 30 | 3.0 |
| 5 | 37.3 | 30 | 30 | — | 2.7 |
| 6 | 36.7 | — | 30 | 30 | 3.3 |
| 7 | 34.8 | — | 60 | — | 5.2 |
| 8 | 34.6 | — | 30 | 30 | 5.4 |
| 9 | 35.4 | 30 | 30 | — | 4.6 |

Table 2 shows the conductivities (at 30, 50, and −10° C.) of the electrolytes given in Table 1.

TABLE 2

| Electrolyte Number | Conductivities ($\times 10^{-4} \Omega^{-1} cm^{-1}$) | | |
| --- | --- | --- | --- |
| | −10° C. | 30° C. | 50° C. |
| 1 | 0.29 | 1.94 | 3.56 |
| 2 | 0.05 | 0.49 | 1.12 |
| 3 | 0.09 | 0.52 | 0.89 |
| 4 | 0.03 | 0.40 | 0.66 |
| 5 | 0.19 | 1.42 | 1.95 |
| 6 | 0.26 | 1.98 | 3.12 |
| 7 | 0.62 | 3.74 | 5.64 |
| 8 | 0.51 | 3.38 | 4.98 |
| 9 | 0.37 | 2.22 | 3.3 |

EXAMPLE 2

The oxidative (anodic) stability of the electrolytes was determined from cyclic voltammetric experiments.

The voltammetric experiments were carried out using a three-electrode electrochemical cell, consisting of stainless steel working (0.25 cm²) and counter (3 cm²) electrodes, and a lithium reference electrode. The electrolyte was sandwiched between the working and counter electrodes, and the reference electrode was placed as close as possible to the working electrode to minimize the iR drop. The potential of the electrochemical cell was scanned between 5 V and −2 V at low scan rates of 1 and 5 mV/s. The anodic potential at which the onset of oxidation current was observed, was considered the potential limit of anodic stability. Table 3 gives the anodic stabilities of these electrolytes.

TABLE 3

| Electrolyte Number | Anodic Potential Limit of Stability (V vs. Li⁺/Li) |
| --- | --- |
| 1 | 2.9 |
| 2 | 4.5 |
| 3 | 4.8 |
| 4 | 4.7 |
| 5 | 4.7 |
| 6 | 4.5 |

All of the electrolytes, except electrolyte #1, appear to be anodically stable up to or beyond 4.5 V versus Li⁺/Li, ideal for use in high voltage rechargeable Li ion batteries. Electrolytes #7, #8, and #9 also have reasonably high ionic conductivities (Table 2), especially at 30° and 50° C., and hence appear to be especially suitable for ambient temperature applications.

EXAMPLE 3

A PVS-based electrolyte containing $LiAsF_6$ (#10) was prepared using the method described in Example 1. The electrolyte precursor mixture consisted of 2.17 g PVS (36.7 mol %), 1.53 g PC (30 mol %), 1.8 g sulfolane (30 mol %), 0.32 g $LiAsF_6$ (3.3 mol %), and 5 drops of Darocur. Just as in the previous example, the electrolyte precursor mixture was cast between two glass slides covered with Teflon films, and irradiated with UV light for about an hour in an Argon atmosphere. The solid electrolyte formed was isolated.

The conductivities of the electrolyte were measured and Table 4 shows the conductivities at −10° C., 30° C., and 50° C.

TABLE 4

| Electrolyte Number | Conductivities ($\times 10^{-4} \Omega^{-1} cm^{-1}$) | | |
| --- | --- | --- | --- |
| | −10° C. | 30° C. | 50° C. |
| 10 | 0.42 | 2.13 | 3.63 |

EXAMPLE 4

The PVS-based electrolyte containing $LiAsF_6$ was characterized for its electrochemical stabilities by carrying out cyclic voltammetric experiments. As described earlier, the electrolyte was sandwiched between the working and counter electrodes, both made of stainless steel, and the lithium reference electrode was placed as close to the working electrode as possible to minimize the iR drop. The potential of the cell was then scanned between 5 V and −2 V at a scan rate of 1 mV/s. The anodic stability of the electrolyte is given in Table 5.

TABLE 5

| Electrolyte Number | Anodic Potential Limit of Stability (V vs. Li$^+$/Li) |
| --- | --- |
| 10 | 4.3 |

EXAMPLE 5

PVS-based electrolyte (#11) containing LiClO$_4$ was prepared using the method described previously. The electrolyte precursor mixture consisted of 2.17 g PVS (36.7 mol %), 1.53 g PC (30 mol %), 1.8 g Sulfolane (30 mol %), 0.17 g LiClO$_4$ (3.3 mol %), and about 5 drops of Darocur. Just as in the previous examples, the electrolyte precursor mixture was cast between two glass slides covered with Teflon films, and irradiated with UV light for about an hour in an Argon atmosphere.

Table 6 presents the conductivities of these electrolytes at −10° C., 30° C., and 50° C.

TABLE 6

| Electrolyte Number | Conductivities ($\times 10^{-4} \Omega^{-1} cm^{-1}$) | | |
| --- | --- | --- | --- |
| | −10° C. | 30° C. | 50° C. |
| 11 | 0.20 | 0.79 | 1.23 |

EXAMPLE 6

The electrochemical stability of electrolyte 11 was determined from cyclic voltammetric experiments. As described previously, a three-electrode cell consisting of stainless steel working and counter electrodes, and a lithium reference electrode, was used. The potential of the cell was scanned between 5 V and −2 V at the slow scan rate of 1 mV/s. Table 7 gives the anodic stability of the electrolyte.

TABLE 7

| Electrolyte Number | Anodic Potential Limit of Stability (V vs. Li$^+$/Li) |
| --- | --- |
| 11 | 4.5 |

EXAMPLE 7

A solid electrolyte consisting of poly(vinyl sulfone), Darocur and a Li salt without a plasticizer solvent, was prepared as follows. The electrolyte precursor mixture consisting of 2.0 g vinyl sulfone, five drops of Darocur and 0.54 g LiClO$_4$ (or 1.0 g LiAsF$_6$) was cast between two Teflon-covered glass slides and irradiated with a UV lamp for about an hour in an Argon atmosphere. The electrolyte films were isolated and their conductivities were measured. They showed the conductivities listed in Table 8.

TABLE 8

| Electrolyte | Conductivity ($\times 10^{-4}$ ohm$^{-1}$ · cm$^{-1}$) |
| --- | --- |
| PVS/LiClO$_4$ | 0.002 |
| PVS/LiAsF$_6$ | 0.002 |

EXAMPLE 8

A C/polymer electrolyte/LiMn$_2$O$_4$ was made with electrolyte #8 to test the suitability of the electrolyte in Li ion batteries. LiMn$_2$O$_4$ cathode material was prepared by heating a homogeneous mixture of LiOH and MnO$_2$ at 750° C. for 24 hours. Since LiMn$_2$O$_4$ has poor electronic conductivity, of the order of $10^{-5}$ $\Omega^{-1}$cm$^{-1}$ carbon was added to provide sufficient electronic conductivity to the composite cathode structure. In order to electrochemically access the LiMn$_2$O$_4$ particles, a polymer electrolyte was also added to the composite cathode.

The weight percent composition of the cathode used is as follows:

| Cathode Component | Composition (weight-percent) |
| --- | --- |
| LiMn$_2$O$_4$ | 45 |
| Carbon | 5 |
| Polymer Electrolyte (6 w/o LiN(CF$_3$SO$_2$)$_2$ 88 w/o EC/PC 6 w/o PAN) | 50 |

The polymer electrolyte was prepared by heating an appropriate mixture of PAN, EC, PC, and LiN(CF$_3$SO$_2$)$_2$ to 135° C. and holding the temperature at that value until a homogeneous solution was obtained. Concurrently, appropriate amounts of LiMn$_2$O$_4$ and carbon were ground together to obtain a homogeneous mixture which was then heated to around 135° C. The solution and the solid were mixed and heated to around 135° C. to form a thick paste. Cathode sheets were fabricated by pressing the thick black paste on an aluminum substrate by running it between two stainless steel rollers.

The carbon anode was prepared by thoroughly mixing 5 μm particle size Conoco XP carbon with the polymer electrolyte, prepared as previously discussed, and then heating the homogeneous mixture at around 135° C. The resulting thick paste was then pressed on a nickel substrate.

A rechargeable Li ion cell was then assembled by sandwiching the PVS-based polymer electrolyte (Electrolyte #8) between the carbon anode and composite LiMn$_2$O$_4$ cathode. The electrode package was then enclosed in a metallized plastic bag and vacuum sealed. The assembled C/polymer electrolyte/LiMn$_2$O$_4$ cell showed good cyclability between 4.3 V and 2 V at 50° C., in agreement with the charge/discharge reactions,

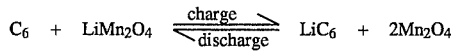

$$C_6 + LiMn_2O_4 \underset{discharge}{\overset{charge}{\rightleftharpoons}} LiC_6 + 2Mn_2O_4$$

The cell was activated by charging first. A capacity of 0.4 mAh was obtained for the second cycle and 0.32 mAh for the fifth cycle.

We claim:

1. A solid polymer electrolyte consisting of complexes between poly(vinyl sulfone) and Li salts.

2. The solid polymer electrolyte of claim 1 wherein said Li salt is a low lattice energy Li salt comprising one or more low lattice energy Li salts chosen from the group consisting of LiAsF$_6$, LiN(SO$_2$CF$_3$)$_2$, LiClO$_4$, LiPF$_6$, LiSO$_3$CF$_3$, LiC(SO$_2$CF$_3$)$_3$ and LiMR$_4$, where M is Al or B and R is a halogen or an alkyl or aryl group.

3. A solid-state electric current producing rechargeable electrochemical cell comprising an anode, a cathode, and a solid polymer electrolyte wherein said solid electrolyte consists of poly(vinyl sulfone), and a Li salt.

4. A solid-state electric current producing cell of claim 3 wherein said Li salt is chosen from the group of low lattice energy salts consisting of $LiAsF_6$, $LiN(SO_2CF_3)_2$, $LiClO_4$, $LiPF_6$, $LiSO_3CF_3$, $LiC(SO_2CF_3)_3$ and $LiMR_4$, where M is Al or B and R is a halogen or an alkyl or aryl group.

5. A rechargeable cell of claim 3 wherein said anode is Li.

6. A rechargeable cell of claim 3 wherein said anode is a Li alloy or a Li insertion compound.

7. A rechargeable cell of claim 3 wherein said anode is carbon.

8. A rechargeable Cell of claim 3 where said cathode is chosen from the group of compounds consisting of $MnO_2$, $LiMn_2O_4$, $LiNiO_2$, $LiCoO_2$, $TiS_2$ and $V_6O_{13}$.

* * * * *